(12) United States Patent
Miller et al.

(10) Patent No.: US 10,489,434 B2
(45) Date of Patent: Nov. 26, 2019

(54) LEVERAGING CONCEPTS WITH INFORMATION RETRIEVAL TECHNIQUES AND KNOWLEDGE BASES

(75) Inventors: Tanya Miller, Colbert, WA (US); Mark Zartler, Garland, TX (US)

(73) Assignee: Verint Americas Inc., Alpharetta (*) Notice: Subject to any disclaimer, the term of this patent is extended or adjusted under 35 U.S.C. 154(b) by 0 days.

(21) Appl. No.: 12/636,571

(22) Filed: Dec. 11, 2009

(65) Prior Publication Data
US 2010/0153398 A1 Jun. 17, 2010

Related U.S. Application Data

(60) Provisional application No. 61/122,203, filed on Dec. 12, 2008.

(51) Int. Cl.
*G06F 16/33* (2019.01)

(52) U.S. Cl.
CPC .................. *G06F 16/3338* (2019.01)

(58) Field of Classification Search
USPC ........................................................ 707/736
See application file for complete search history.

(56) References Cited

U.S. PATENT DOCUMENTS

| | | | |
|---|---|---|---|
| 5,278,980 A | 1/1994 | Pedersen et al. | |
| 5,339,391 A | 8/1994 | Wroblewski et al. | |
| 5,418,948 A * | 5/1995 | Turtle ........................... | 707/700 |
| 5,535,120 A | 7/1996 | Chong et al. | |
| 5,615,112 A | 3/1997 | Liu Sheng et al. | |
| 5,677,835 A * | 10/1997 | Carbonell et al. ................ | 704/8 |
| 5,682,539 A | 10/1997 | Conrad et al. | |
| 5,727,174 A | 3/1998 | Aparicio, IV et al. | |
| 6,012,053 A | 1/2000 | Pant et al. | |
| 6,038,560 A * | 3/2000 | Wical ..................... | G06F 16/355 706/50 |
| 6,112,177 A | 8/2000 | Cosatto et al. | |
| 6,144,938 A | 11/2000 | Surace et al. | |
| 6,175,829 B1 | 1/2001 | Li et al. | |

(Continued)

FOREIGN PATENT DOCUMENTS

| | | |
|---|---|---|
| CN | 103051669 | 4/2013 |
| WO | WO2011088053 | 7/2011 |

OTHER PUBLICATIONS

Non-Final Office Action for U.S. Appl. No. 12/564,546, dated Dec. 21, 2011, Tanya Miller et al., "Apparatus, System, and Method for Natural Language Processing", 12 pages.

(Continued)

*Primary Examiner* — Muluemebet Gurmu
(74) *Attorney, Agent, or Firm* — Meunier Carlin & Curfman LLC

(57) ABSTRACT

Various embodiments are described which leverage techniques for breaking down critical ideas from an inputted phrase into concepts in order to provide a response that is more relevant to the inputted phrase. In this regard, concepts and/or concept patterns are utilized with information retrieval searching to provide more relevant and concise documents in response to an inputted phrase. In addition, concepts and/or concept patterns are utilized with respect to assessing information (e.g., documents) available in a knowledge base and building appropriate pre-defined responses to an inputted phrase.

19 Claims, 5 Drawing Sheets

(56) References Cited

U.S. PATENT DOCUMENTS

| | | |
|---|---|---|
| 6,282,507 B1 | 8/2001 | Horiguchi et al. |
| 6,285,978 B1 | 9/2001 | Bernth et al. |
| 6,353,817 B1* | 3/2002 | Jacobs et al. ............... 706/50 |
| 6,388,665 B1 | 5/2002 | Linnett et al. |
| 6,396,951 B1* | 5/2002 | Grefenstette ............ 382/187 |
| 6,401,061 B1 | 6/2002 | Zieman |
| 6,658,627 B1* | 12/2003 | Gallup et al. .............. 715/236 |
| 6,661,418 B1 | 12/2003 | McMillan et al. |
| 6,757,362 B1 | 6/2004 | Cooper et al. |
| 6,826,540 B1 | 11/2004 | Plantec et al. |
| 6,829,603 B1 | 12/2004 | Chai et al. |
| 6,834,120 B1 | 12/2004 | LeClerc et al. |
| 6,987,514 B1 | 1/2006 | Beresin et al. |
| 6,999,932 B1 | 2/2006 | Zhou |
| 7,058,902 B2 | 6/2006 | Iwema et al. |
| 7,076,430 B1 | 7/2006 | Cosatto et al. |
| 7,194,483 B1 | 3/2007 | Mohan et al. |
| 7,263,493 B1 | 8/2007 | Provost et al. |
| 7,337,158 B2 | 2/2008 | Fratkina et al. |
| 7,426,697 B2 | 9/2008 | Holecek et al. |
| 7,483,829 B2 | 1/2009 | Murakami et al. |
| 7,536,413 B1 | 5/2009 | Mohan et al. |
| 7,539,656 B2 | 5/2009 | Fratkina et al. |
| 7,548,899 B1 | 6/2009 | Del Favero, Jr. et al. |
| 7,558,792 B2* | 7/2009 | Bier |
| 7,599,831 B2 | 10/2009 | Ford |
| 7,610,382 B1* | 10/2009 | Siegel ...................... 709/226 |
| 7,711,547 B2 | 5/2010 | Abir |
| 7,739,604 B1 | 6/2010 | Lyons et al. |
| 7,797,146 B2 | 9/2010 | Harless et al. |
| 7,818,183 B2 | 10/2010 | Schoenberg |
| 7,912,701 B1 | 3/2011 | Gray et al. |
| 7,970,663 B2 | 6/2011 | Ganz et al. |
| 8,160,979 B1 | 4/2012 | Evans et al. |
| 8,346,563 B1 | 1/2013 | Hjelm et al. |
| 8,352,266 B2* | 1/2013 | Farmaner et al. ............ 704/257 |
| 8,433,556 B2 | 4/2013 | Fraser et al. |
| 8,473,420 B2 | 6/2013 | Bohus et al. |
| 8,519,963 B2 | 8/2013 | Kocienda et al. |
| 8,670,979 B2 | 3/2014 | Gruber et al. |
| 8,677,377 B2 | 3/2014 | Cheyer et al. |
| 8,731,929 B2 | 5/2014 | Kennewick et al. |
| 8,756,326 B1 | 6/2014 | Elberse et al. |
| 8,762,152 B2 | 6/2014 | Bennett et al. |
| 8,930,191 B2 | 1/2015 | Gruber et al. |
| 8,942,986 B2 | 1/2015 | Cheyer et al. |
| 8,943,094 B2 | 1/2015 | Brown et al. |
| 9,117,447 B2 | 8/2015 | Gruber et al. |
| 9,202,171 B2 | 12/2015 | Kuhn |
| 9,501,741 B2 | 11/2016 | Cheyer et al. |
| 2001/0000356 A1 | 4/2001 | Woods |
| 2001/0033298 A1 | 10/2001 | Slotznick |
| 2001/0044751 A1 | 11/2001 | Pugliese, III et al. |
| 2001/0049688 A1 | 12/2001 | Fratkina et al. |
| 2001/0053968 A1 | 12/2001 | Galitsky et al. |
| 2002/0008716 A1 | 1/2002 | Colburn et al. |
| 2002/0032591 A1 | 3/2002 | Mahaffy et al. |
| 2002/0123994 A1* | 9/2002 | Schabes et al. ............. 707/5 |
| 2002/0129031 A1 | 9/2002 | Lau et al. |
| 2002/0198885 A1 | 12/2002 | Streepy, Jr. |
| 2003/0004908 A1 | 1/2003 | Linthicum et al. |
| 2003/0041307 A1 | 2/2003 | Park |
| 2003/0061029 A1 | 3/2003 | Shaket |
| 2003/0088547 A1* | 5/2003 | Hammond .................. 707/3 |
| 2003/0126089 A1 | 7/2003 | Fukuoka et al. |
| 2003/0126090 A1 | 7/2003 | Fukuoka et al. |
| 2003/0142829 A1 | 7/2003 | Avigni |
| 2003/0212544 A1 | 11/2003 | Acero et al. |
| 2004/0107088 A1 | 6/2004 | Budzinski |
| 2004/0141013 A1 | 7/2004 | Alcazar et al. |
| 2004/0186705 A1 | 9/2004 | Morgan et al. |
| 2005/0027694 A1 | 2/2005 | Sauermann |
| 2005/0054381 A1 | 3/2005 | Lee et al. |
| 2005/0080628 A1* | 4/2005 | Kuperstein ............ G10L 15/22 704/270.1 |
| 2005/0120276 A1 | 6/2005 | Kolawa et al. |
| 2006/0004826 A1 | 1/2006 | Zartler et al. |
| 2006/0020466 A1 | 1/2006 | Cousineau et al. |
| 2006/0036430 A1 | 2/2006 | Hu |
| 2006/0037076 A1 | 2/2006 | Roy |
| 2006/0047632 A1 | 3/2006 | Zhang |
| 2006/0067352 A1 | 3/2006 | John et al. |
| 2006/0074689 A1 | 4/2006 | Cosatto et al. |
| 2006/0080107 A1* | 4/2006 | Hill et al. ................ 704/275 |
| 2006/0092978 A1 | 5/2006 | John et al. |
| 2006/0161414 A1 | 7/2006 | Carignano et al. |
| 2006/0206483 A1* | 9/2006 | Knepper ........... G06F 17/30616 |
| 2006/0253427 A1 | 11/2006 | Wu et al. |
| 2007/0043687 A1 | 2/2007 | Bodart et al. |
| 2007/0100790 A1 | 5/2007 | Cheyer et al. |
| 2007/0106670 A1 | 5/2007 | Yoakum et al. |
| 2007/0130112 A1 | 6/2007 | Lin |
| 2007/0134631 A1 | 6/2007 | Hardy et al. |
| 2007/0156677 A1 | 7/2007 | Szabo |
| 2007/0185702 A1 | 8/2007 | Harney et al. |
| 2007/0197296 A1 | 8/2007 | Lee |
| 2007/0242656 A1 | 10/2007 | Klassen et al. |
| 2007/0265533 A1 | 11/2007 | Tran |
| 2007/0294229 A1 | 12/2007 | Au |
| 2008/0005158 A1* | 1/2008 | Zartler et al. .............. 707/102 |
| 2008/0010268 A1 | 1/2008 | Liao et al. |
| 2008/0016040 A1 | 1/2008 | Jones et al. |
| 2008/0036756 A1 | 2/2008 | Gaos et al. |
| 2008/0091406 A1 | 4/2008 | Baldwin et al. |
| 2008/0096533 A1 | 4/2008 | Manfredi et al. |
| 2008/0133444 A1 | 6/2008 | Gao et al. |
| 2008/0162498 A1 | 7/2008 | Omoigui |
| 2008/0222734 A1 | 9/2008 | Redlich et al. |
| 2008/0235604 A1 | 9/2008 | Ebert |
| 2008/0305815 A1 | 12/2008 | McDonough |
| 2009/0006525 A1 | 1/2009 | Moore |
| 2009/0030800 A1 | 1/2009 | Grois |
| 2009/0063427 A1* | 3/2009 | Zuta et al. .................. 707/3 |
| 2009/0070103 A1 | 3/2009 | Beggelman et al. |
| 2009/0077488 A1 | 3/2009 | Ording |
| 2009/0089100 A1 | 4/2009 | Nenov et al. |
| 2009/0119095 A1 | 5/2009 | Beggelman et al. |
| 2009/0119587 A1 | 5/2009 | Allen et al. |
| 2009/0157386 A1 | 6/2009 | Zhou |
| 2009/0171923 A1* | 7/2009 | Nash et al. .................. 707/4 |
| 2009/0182702 A1 | 7/2009 | Miller |
| 2009/0204677 A1 | 8/2009 | Michaelis et al. |
| 2009/0216691 A1 | 8/2009 | Borzestowski et al. |
| 2009/0225041 A1 | 9/2009 | Kida et al. |
| 2009/0227223 A1 | 9/2009 | Jenkins |
| 2009/0228264 A1 | 9/2009 | Williams et al. |
| 2009/0235356 A1 | 9/2009 | Jensen et al. |
| 2009/0248399 A1 | 10/2009 | Au |
| 2009/0271205 A1 | 10/2009 | Finn et al. |
| 2010/0005122 A1 | 1/2010 | Jackson |
| 2010/0030549 A1 | 2/2010 | Lee et al. |
| 2010/0050237 A1 | 2/2010 | Bokor et al. |
| 2010/0070448 A1 | 3/2010 | Omoigui |
| 2010/0070871 A1 | 3/2010 | Liesche et al. |
| 2010/0153398 A1 | 6/2010 | Miller et al. |
| 2010/0169336 A1 | 7/2010 | Eckhoff-Hornback et al. |
| 2010/0218113 A1 | 8/2010 | White et al. |
| 2010/0226490 A1 | 9/2010 | Schultz et al. |
| 2010/0235808 A1 | 9/2010 | Dayan et al. |
| 2010/0281012 A1 | 11/2010 | Imig et al. |
| 2010/0312547 A1 | 12/2010 | Van Os et al. |
| 2011/0004841 A1 | 1/2011 | Gildred et al. |
| 2011/0071819 A1 | 3/2011 | Miller et al. |
| 2011/0078105 A1 | 3/2011 | Wallace |
| 2011/0119196 A1 | 5/2011 | Ventura et al. |
| 2011/0179126 A1 | 7/2011 | Wetherell et al. |
| 2011/0213642 A1 | 9/2011 | Makar et al. |
| 2011/0282664 A1 | 11/2011 | Tanioka et al. |
| 2011/0288947 A1 | 11/2011 | Biran |
| 2011/0301982 A1 | 12/2011 | Green, Jr. et al. |
| 2011/0307245 A1 | 12/2011 | Hanneman et al. |
| 2012/0016678 A1 | 1/2012 | Gruber et al. |
| 2012/0022872 A1 | 1/2012 | Gruber et al. |
| 2012/0030553 A1 | 2/2012 | Delpha et al. |

(56) References Cited

U.S. PATENT DOCUMENTS

| | | |
|---|---|---|
| 2012/0041903 A1 | 2/2012 | Beilby et al. |
| 2012/0078891 A1 | 3/2012 | Brown et al. |
| 2012/0110473 A1 | 5/2012 | Tseng |
| 2012/0117005 A1 | 5/2012 | Spivack |
| 2012/0166373 A1* | 6/2012 | Sweeney ............ G06F 17/30914 706/14 |
| 2012/0221502 A1 | 8/2012 | Jerram et al. |
| 2012/0245926 A1 | 9/2012 | Montyne et al. |
| 2012/0253825 A1 | 10/2012 | Di Fabbrizio et al. |
| 2012/0265528 A1 | 10/2012 | Gruber et al. |
| 2012/0284040 A1 | 11/2012 | Dupin |
| 2012/0311541 A1 | 12/2012 | Bullard et al. |
| 2013/0017523 A1 | 1/2013 | Barborak et al. |
| 2013/0031476 A1 | 1/2013 | Coin et al. |
| 2013/0046149 A1 | 2/2013 | Gettelman et al. |
| 2013/0152092 A1 | 6/2013 | Yadgar |
| 2013/0204813 A1 | 8/2013 | Master et al. |
| 2013/0254139 A1 | 9/2013 | Lei |
| 2013/0258040 A1 | 10/2013 | Kaytaz et al. |
| 2013/0262467 A1 | 10/2013 | Zhang et al. |
| 2013/0275875 A1 | 10/2013 | Gruber et al. |
| 2013/0283168 A1 | 10/2013 | Brown et al. |
| 2014/0029734 A1 | 1/2014 | Kim et al. |
| 2014/0040748 A1 | 2/2014 | Lemay et al. |
| 2014/0047001 A1 | 2/2014 | Phillips et al. |
| 2014/0053102 A1 | 2/2014 | Lee et al. |
| 2014/0074454 A1 | 3/2014 | Brown et al. |
| 2014/0098948 A1 | 4/2014 | Kulkarni et al. |
| 2014/0115456 A1 | 4/2014 | White et al. |
| 2014/0164476 A1 | 6/2014 | Thomson |
| 2014/0164508 A1 | 6/2014 | Lynch et al. |
| 2014/0181741 A1 | 6/2014 | Apacible et al. |
| 2014/0201675 A1 | 7/2014 | Joo et al. |
| 2014/0244266 A1 | 8/2014 | Brown et al. |
| 2014/0244712 A1 | 8/2014 | Walters et al. |
| 2014/0245140 A1 | 8/2014 | Brown et al. |
| 2014/0282109 A1 | 9/2014 | Wenger et al. |
| 2014/0297284 A1 | 10/2014 | Gruber et al. |
| 2014/0310005 A1 | 10/2014 | Brown et al. |
| 2014/0317502 A1 | 10/2014 | Brown et al. |
| 2014/0337048 A1 | 11/2014 | Brown et al. |
| 2014/0343924 A1 | 11/2014 | Brown et al. |
| 2014/0343928 A1 | 11/2014 | Brown et al. |
| 2014/0365223 A1 | 12/2014 | Brown et al. |
| 2014/0365407 A1 | 12/2014 | Brown et al. |
| 2015/0066817 A1 | 3/2015 | Slayton et al. |
| 2015/0185996 A1 | 7/2015 | Brown et al. |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0363697 A1 | 12/2015 | Spivack |
| 2016/0012186 A1 | 1/2016 | Zasowski et al. |
| 2016/0110071 A1 | 4/2016 | Brown et al. |
| 2017/0132220 A1 | 5/2017 | Brown et al. |
| 2017/0277993 A1 | 9/2017 | Beaver et al. |

OTHER PUBLICATIONS

Final Office Action for U.S. Appl. No. 12/564,546, dated Feb. 26, 2013, Tanya Miller et al., "Apparatus, System, and Method for Natural Language Processing", 15 pages.
Non-Final Office Action for U.S. Appl. No. 12/014,229, dated Mar. 15, 2013, Tanya M. Miller, "Active Lab", 14 pages.
Non-Final Office Action for U.S. Appl. No. 12/636,571, dated Apr. 12, 2013, Tanya Miller et al., "Leveraging Concepts With Information Retrieval Techniques and Knowledge Bases", 31 pages.
Non-Final Office Action for U.S. Appl. No. 12/564,546, dated Jun. 12, 2013, Tanya Miller et al., "Apparatus, System, and Method for Natural Language Processing", 18 pages.
Final Office Action for U.S. Appl. No. 12/014,229, dated Nov. 25, 2013, Tanya M. Miller, "Active Lab", 15 pages.

U.S. Appl. No. 13/774,381, filed Feb. 22, 2013, Fred A. Brown et al., "Interaction with a Portion of a Content Item through a Virtual Assistant," 68 pages.
U.S. Appl. No. 13/774,519, filed Feb. 22, 2013, Fred A. Brown et al, "Virtual Assistant Transfer between Smart Devices," 65 pages.
Final Office Action for U.S. Appl. No. 13/341,261, dated Feb. 27, 2014, Fred A. Brown, "Providing Variable Responses in a Virtual-Assistant Environment", 32 pages.
Office action for U.S. Appl. No. 13/341,261, dated Aug. 14, 2013, Brown et al., "Providing Variable Responses in a Virtual-Assistant Environment", 22 pages.
"AskJennMediaCoverage", retrieved on Nov. 12, 2014, 76 pages.
Cassell, et al., "Embodied Conversational Agents", MIT Press, 2000, pp. 272 and 275.
Office action for U.S. Appl. No. 14/302,096, dated Oct. 8, 2014, Brown, "Active Lab", 27 pages.
Office Action for U.S. Appl. No. 13/341,261, dated Nov. 6, 2014, Fred A. Brown, "Providing Variable Responses in a Virtual-Assistant Environment", 26 pages.
Final Office Action for U.S. Appl. No. 14/293,673, dated Dec. 4, 2014, Fred A. Brown, "Virtual Assistant Conversations", 22 pages.
Office Action for U.S. Appl. No. 14/315,852, dated Dec. 4, 2014, Fred Brown, "Virtual Assistant Conversations for Ambiguous User Input and Goals", 15 pages.
Office Action for U.S. Appl. No. 14/451,009, dated Dec. 4, 2014, Fred Brown, "Wearable-Based Virtual Agents", 9 pages.
Office action for U.S. Appl. No. 14/293,529, dated Sep. 10, 2014, Brown et al., "Virtual Assistant Team Identification", 13 pages.
Office action for U.S. Appl. No. 14/293,619, dated Sep. 8, 2014, Brown et al., "Virtual Assistant Acquisitions and Training", 15 pages.
Office action for U.S. Appl. No. 14/293,673, dated Sep. 8, 2014, Riegler et al., "Virtual Assistant Conversations", 22 pages.
Office action for U.S. Appl. No. 14/467,221, dated Oct. 9, 2014, Brown, "Context-Based Virtual Assistant Conversations", 24 pages.
PCT Search Report and Written Opinion dated Nov. 12, 2014 for PCT Application No. PCT/US14/31047, 14 Pages.
"The Army's Recruiter", New York Public Radio, Media File, Retrieved on Nov. 11, 2014, 9 minutes 1 second.
"Undercover Virtual Agent Article", KOMO News, retrieved Nov. 12, 2014, 2 pages.
Office Action for U.S. Appl. No. 14/467,715, dated Oct. 1, 2014, Fred Brown, "Virtual Assistant Conversations", 14 pages.
Office Action for U.S. Appl. No. 12/014,229, dated Feb. 13, 2015, Tanya M. Miller, "Active Lab", 16 pages.
Office action for U.S. Appl. No. 14/293,586, dated Feb. 17, 2015, Brown et al., "Virtual Assistant Team Customization", 11 pages.
Office action for U.S. Appl. No. 14/467,221, dated Feb. 17, 2015, Brown et al., "Context-Based Virtual Assistant Conversations", 5 pages.
Final Office Action for U.S. Appl. No. 14/293,529, dated Feb. 23, 2015, Fred A. Brown, "Virtual Assistant Team Identification", 17 pages.
Office Action for U.S. Appl. No. 14/302,096, dated Jan. 12, 2015, Fred Brown, "Active Lab", 4 pages.
"The Armys Robot Recruiter", Transcript from New York Public Radio, Aug. 8, 2014, 3 pages.
"Case Study With Alme, Alaska Airlines soars", retrieved on Apr. 10, 2015 at <<http://www.nextit.com/media/downloads/Case-study-Alaska-Air.pdf>>, 3 pages.
"Frost & Sullivan Commends Next IT for Leading the Virtual Agent Applications Industry in Competitive Strategy Innovation", Frost & Sullivan, Dec. 18, 2014, 5 pages.
"Meet Jenn, Your Virtual Assistant at alaskaair.com", retrieved on Apr. 13, 2015 at <<http://www.alaskaair.com/content/about-us/site-info/ask-jenn.aspx>>, 1 page.
Final Office Action for U.S. Appl. No. 14/315,852, dated Apr. 10, 2015, Fred Brown, "Virtual Assistant Conversations for Ambiguous User Input and Goals", 18 pages.
Final Office Action for U.S. Appl. No. 14/293,619, dated Apr. 13, 2015, Fred A. Brown, "Virtual Assistant Acquisitions and Training", 17 pages.
Final Office Action for U.S. Appl. No. 14/467,715, dated Apr. 16, 2015, Fred Brown, "Virtual Assistant Conversations", 5 pages.

(56) References Cited

OTHER PUBLICATIONS

Office action for U.S. Appl. No. 13/341,261, dated May 21, 2015, Brown et al., "Providing Variable Responses in a Virtual-Assistant Environment", 30 pages.
Final Office Action for U.S. Appl. No. 14/451,009, dated May 21, 2015, Fred Brown, "Wearable-Based Virtual Agents", 10 pages.
"SGT STAR Wins Intelligent Assistant Award", San Francisco, Calif (PRWEB) Sep. 24, 2014, PRWEB Online Visibility from Vocus, 2 pages.
"TAM", Case Study Meet Juli—TAM Airlines' most famous new hire, Jun. 2013, Next IT Corporation, 2 pages.
Office action for U.S. Appl. No. 14/451,009, dated Jan. 5, 2016, Brown et al., "Wearable-Based Virtual Agents", 10 pages.
Office action for U.S. Appl. No. 14/293,673, dated Jan. 15, 2016, Brown et al., "Virtual Assistant Conversations," 29 pages.
Office action for U.S. Appl. No. 14/467,221, dated Feb. 18, 2016, Brown et al., "Context-Based Virtual Assistant Conversations," 14 pages.
Office action for U.S. Appl. No. 14/293,619, dated Feb. 26, 2016, Brown et al., "Virtual Assistant Acquisitions and Training," 16 pages.
Office Action for U.S. Appl. No. 14/293,529, dated Oct. 1, 2015, Fred A. Brown, "Virtual Assistant Team Identification", 18 pages.
Office Action for U.S. Appl. No. 13/341,261, dated Sep. 23, 2015, Fred A. Brown, "Providing Variable Responses in a Virtual-Assistant Environment", 26 pages.
Office Action for U.S. Appl. No. 14/315,852, dated Sep. 24, 2015, Fred Brown, "Virtual Assistant Conversations for Ambiguous User Input and Goals", 6 pages.
Final Office Action for U.S. Appl. No. 14/293,529, dated Jun. 15, 2015, Fred A. Brown, "Virtual Assistant Team Identification", 16 pages.
Final Office Action for U.S. Appl. No. 14/293,586, dated Jul. 24, 2015, Fred A. Brown, "Virtual Assistant Team Customization", 14 pages.
Office Action for U.S. Appl. No. 14/293,673, dated Jul. 24, 2015, Fred A. Brown, "Virtual Assistant Conversations", 25 pages.
Final Office Action for U.S. Appl. No. 14/302,096, dated Jul. 29, 2015, Fred Brown, "Active Lab", 7 pages.
Office Action for U.S. Appl. No. 14/293,619, dated Aug. 13, 2015, Fred A. Brown, "Virtual Assistant Acquisitions and Training", 17 pages.
PCT Search Report and Written Opinion dated Sep. 2, 2015 for PCT Application No. PCT/US15/33594, 9 pages.
Office action for U.S. Appl. No. 12/014,229, dated Nov. 19, 2015, Inventor #1, "Active Lab", 8 pages.
Pandorabots Inc., "AIML Targeting: Supervised Learning for Bots", uploaded on Oct. 29, 2009, at https:// www.youtube.com/watch?v= aGe30NTVDOk, 5 pages.
Office action for U.S. Appl. No. 14/293,619, dated Oct. 6, 2016, Brown et al., "Virtual Assistant Acquisitions and Training", 17 pages.
Office action for U.S. Appl. No. 14/293,673, dated Nov. 1, 2016, Brown et al., "Virtual Assistant Conversations", 34 pages.
Office action for U.S. Appl. No. 14/467,221, dated Nov. 3, 2016, Brown et al., "Context-Based Virtual Assistant Conversations", 15 pages.
Office action for U.S. Appl. No. 13/865,789, dated Nov. 7, 2016, Brown et al., "Virtual Assistant Focused User Interfaces", 20 pages.
Office Action for U.S. Appl. No. 13/341,261, dated Sep. 15, 2016, Fred A. Brown, "Providing Variable Responses in a Virtual-Assistant Environment", 29 pages.
Office action for U.S. Appl. No. 14/293,586, dated Sep. 23, 2016, Brown et al., "Virtual Assistant Team Customization", 9 pages.
Office Action for U.S. Appl. No. 14/302,096, dated Sep. 27, 2016, Brown et al., "Regression Testing", 6 pages.
Office action for U.S. Appl. No. 13/341,261, dated Mar. 24, 2016, Brown et al., "Providing Variable Responses in a Virtual-Assistant Environment", 30 pages.

Office action for U.S. Appl. No. 14/446,153, dated Mar. 25, 2016 Brown et al., "Conversational Virtual Healthcare Assistant", 7 pages.
Final Office Action for U.S. Appl. No. 14/446,153, dated Apr. 29, 2015, Fred A. Brown, "Conversational Virtual Healthcare Assistant", 9 pages.
Final Office Action for U.S. Appl. No. 13/449,927, dated Apr. 9, 2015, Fred A. Brown, "Conversation User Interface", 35 pages.
Office action for U.S. Appl. No. 14/467,715, dated May 18, 2016, Brown et al., "Virtual Assistant Conversations", 14 pages.
Office Action for U.S. Appl. No. 13/607,414, dated Jul. 21, 2015, Fred A. Brown, "Conversational Virtual Healthcare Assistant", 25 pages.
Office Action for U.S. Appl. No. 13/449,927, dated Aug. 15, 2014, Fred A. Brown, "Conversation User Interface", 29 pages.
Office Action for U.S. Appl. No. 14/446,153, dated Sep. 18, 2015, Fred A. Brown, "Conversational Virtual Healthcare Assistant", 11 pages.
Office Action for U.S. Appl. No. 14/446,153, dated Sep. 26, 2014, Fred A. Brown, "Conversational Virtual Healthcare Assistant", 7 pages.
Office action for U.S. Appl. No. 14/451,009, dated Jul. 15, 2016, Brown et al., "Wearable-Based Virtual Agents", 6 pages.
Office action for U.S. Appl. No. 14/446,153, dated Aug. 25, 2016, Brown et al., "Conversational Virtual Healthcare Assistant", 13 pages.
Office action for U.S. Appl. No. 14/293,529, dated Aug. 31, 2016, Brown et al., "Virtual Assistant Team Identification", 18 pages.
Office action for U.S. Appl. No. 14/293,529, dated Mar. 17, 2016, Brown et al., "Virtual Assistant Team Identification," 19 pages.
Office action for U.S. Appl. No. 14/293,586, dated Mar. 17, 2016, Brown et al., "Virtual Assistant Team Customization," 13 pages.
AppleKeynotes, "Apple Special Event 2011—Siri Introduction", YouTube, retrieved on Oct. 21, 2016 at <<https://www.youtube.com/watch?v=agzltTz35QQ>>, Mar. 22, 2013, 1 page.
The Supplementary European Search Report dated Oct. 31, 2016 for European Patent Application No. 14785575.3, 10 pages.
Office action for U.S. Appl. No. 12/014,229, dated Nov. 16, 2016, Miller, "Active Lab", 8 pages.
Office action for U.S. Appl. No. 14/467,715, dated Dec. 1, 2016, Brown et al., "Virtual Assistant Conversations", 10 pages.
Langkilde, Irene et al., "Automatic Prediction of Problematic Human-Computer Dialogues in 'How May I Help You?'", AT&T Labs Research, 1999, 5 pages.
The Extended European Search Report dated Mar. 17, 2017 for European patent application No. 14785575.3, 16 pages.
Walker, Marilyn et al., "Learning to Predict Problematic Situations in a Spoken Dialogue System: Experiments with How May I Help You?", AT&T Labs Research, NAACL 2000 Proceedings of the 1st North American chapter of the Association for Computational Linguistics conference, Seattle, Washington, Apr. 29-May 4, 2000, 8 pages.
Office Action for U.S. Appl. No. 14/293,529, dated Jan. 31, 2017, Fred A. Brown, "Virtual Assistant Identification", 20 pages.
Office Action for U.S. Appl. No. 14/837,282, dated Jan. 20, 2017, Spivack, "System and Method for Providing Distributed Intelligent Assistance", 16 pages.
Office Action for U.S. Appl. No. 13/271,175, dated Oct. 7, 2014, Nova T. Spivack, "System and Method for Providing Distributed Intelligent Assistance", 14 pages.
Office Action for U.S. Appl. No. 13/341,261, dated Feb. 7, 2017, Fred A. Brown, "Providing Variable Responses in a Virtual-Assistant Environment", 34 pages.
Final Office Action for U.S. Appl. No. 14/293,673, dated Apr. 25, 2017, Fred A. Brown, "Virtual Assistant Conversations", 32 pages.
Office action for U.S. Appl. No. 13/865,789, dated May 19, 2017, Brown et al., "Virtual Assistant Focused User Interfaces", 22 pages.
Final Office Action for U.S. Appl. No. 13/271,175, dated May 30, 2014, Nova T. Spivack, "System and Method for Providing Distributed Intelligent Assistance", 14 pages.
Office action for U.S. Appl. No. 14/293,619, dated 05/04/20017, Brown et al., "Virtual Assistant Acquisitions and Training", 18 pages.

(56) References Cited

OTHER PUBLICATIONS

Office Action for U.S. Appl. No. 12/014,229, dated Jun. 8, 2017, Tanya M. Miller, "Active Lab", 10 pages.
Non-Final Office Action for U.S. Appl. No. 13/271,175, dated Jul. 19, 2013, Nova T Spivack, "System and Method for Providing Distributed Intelligent Assistance", 13 pages.
Office Action for U.S. Appl. No. 14/837,282, dated Oct. 20, 2015, Nova T. Spivack, "System and Method for Providing Distributed Intelligent Assistance", 8 pages.
Krahmer, Emiel et al., "Problem Spotting in Human-Machine Interaction", IPO, Center for Research on User-System Interaction, Sixth European Conference on Speech Communication and Technology, Sep. 5-9, 1999, Budapest, Hungary, 4 pages.
Office action for U.S. Appl. No. 14/467,221, dated Jul. 25, 2017, Brown et al., "Context-Based Virtual Assistant Conversations", 15 pages.
Office Action for U.S. Appl. No. 14/467,715, dated Jul. 25, 2017, Brown et al., "Virtual Assistant Conversations", 12 pages.
Wikipedia page "CALO", retrieved on Nov. 15, 2017 at <<https://en.wikipedia.org/wiki/CALO>>, 5 pages.
Guzzoni, Didier, et al., "Modeling Human-Agent Interaction with Active Ontologies" Spring 2007 AAAI Symposium, 8 pages.
Office Action for U.S. Appl. No. 14/293,619, dated Oct. 5, 2017, Fred A. Brown, "Virtual Assistant Acquisitions and Training", 21 pages.
Office Action for U.S. Appl. No. 14/980,388, dated Nov. 27, 2017, Brown, "Conversation User Interface", 27 pages.

\* cited by examiner

LEVERAGING CONCEPTS WITH INFORMATION RETRIEVAL TECHNIQUES AND KNOWLEDGE BASES

CROSS-REFERENCE TO RELATED APPLICATION

The present application claims priority to U.S. Provisional Patent Application Ser. No. 61/122,203, filed Dec. 12, 2008, under 35 U.S.C. § 119(e), which is incorporated herein by reference.

BACKGROUND

Providing a response that is relevant to a user's search phrase can be challenging. Part of the reason for this is that people don't always express ideas in the same way or desire the same depth of detail in a response. For instance, a person with significant experience in finance will likely express a search phrase directed to learning about interest rates differently than someone with little or no finance experience, and will likely desire a response with a different level of detail as well.

Traditional information retrieval techniques, which typically search and retrieve/identify voluminous amounts of information, are not optimal for providing users with appropriate and relevant responses. This is because these techniques typically rely on vocabulary term matching when searching through documents to retrieve/identify for a response. As such, relevant documents that do not have matching vocabulary words and/or phrases are often not retrieved while documents that are not relevant to the user, but that have matching vocabulary words and/or phrases, are.

Furthermore, knowledge bases that are specifically designed to get users appropriate and relevant responses typically require a great deal of human effort with respect to their maintenance and improvement. As such, tools facilitating this maintenance and improvement can be of great value.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments leverage techniques for breaking down critical ideas from an inputted phrase into concepts in order to provide a response that is more relevant to the inputted phrase. In this regard, concepts and/or concept patterns are utilized with information retrieval searching to provide more relevant and concise documents in response to an inputted phrase. In addition, concepts and/or concept patterns are utilized with respect to assessing information (e.g., documents) available in a knowledge base and building appropriate pre-defined responses to an inputted phrase.

In one or more embodiments, an inputted phrase is received and concepts and/or concept patterns are attributed to the phrase such that a document set can be searched to find those documents associated with the attributed concepts and/or concept patterns. One or more of these identified documents can then be provided in a response. In at least some embodiments, individual concepts are composed of (1) Vocab Terms that include a grouping of unambiguous synonyms and misspellings, (2) Helper Terms of words that have no unambiguous synonyms and/or (3) Building Blocks of lists of vocabulary terms, lists of helper terms and/or lists of concepts.

In one or more embodiments, concepts are attributed to the documents of a knowledge base. The documents are then indexed based on the concepts and the resulting index is used as a tool to assess the breadth and depth of information available in the knowledge base and to build and/or modify certain pre-defined responses to certain types of inputted phrases. For example, in at least some embodiments, one or more knowledge base units composed of one or more patterns are built and/or modified based at least in part by assessing/analyzing the index. When one or more of these knowledge base unit's patterns matches a pattern found in an inputted phrase, that knowledge base unit triggers a response that can include, among other things, one or more of the knowledge base documents.

FIGURES

The same numbers are used throughout the drawings to reference like features.

DESCRIPTION

Figure 1:
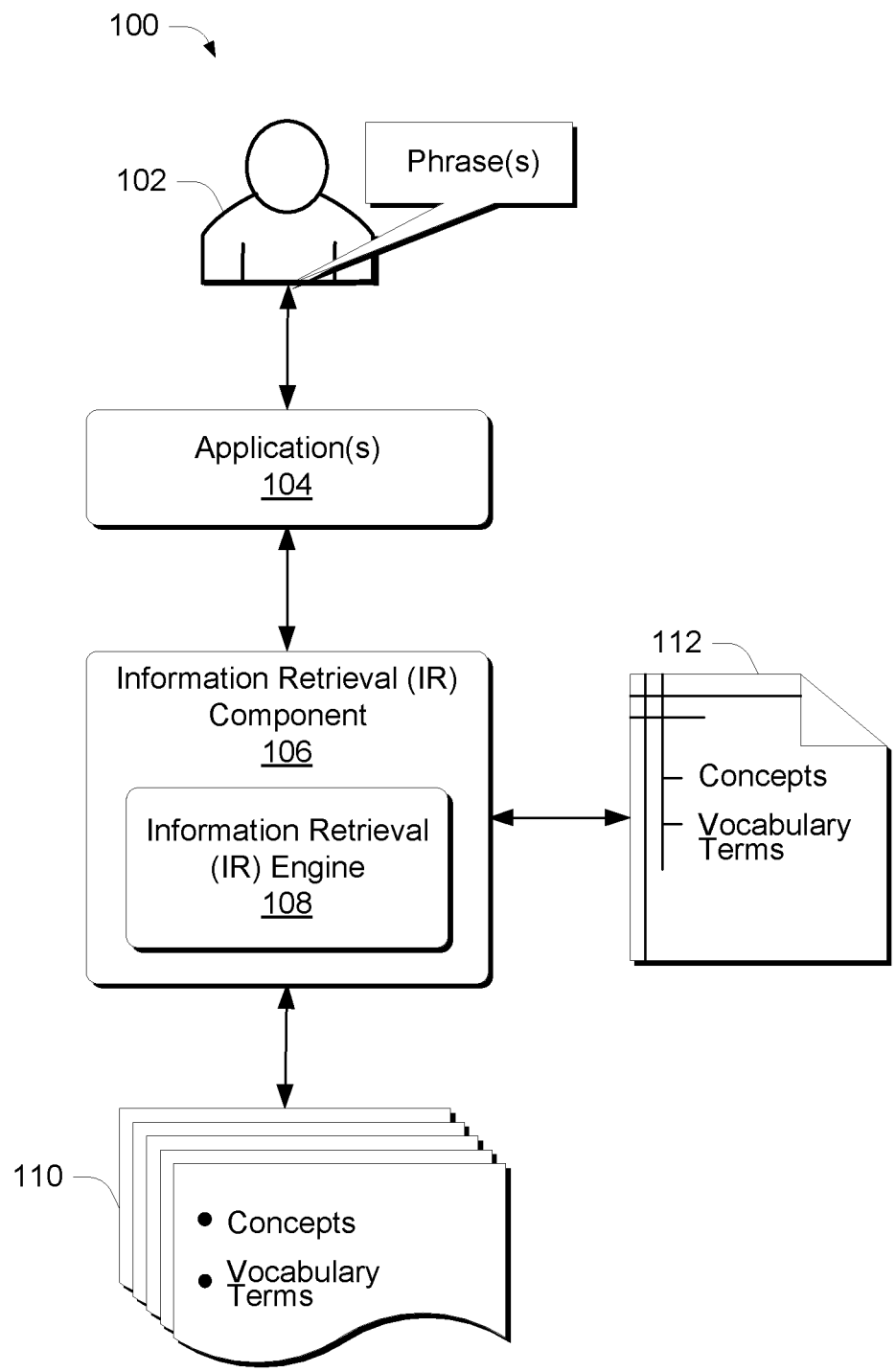
FIG. 1 illustrates one embodiment of an environment in which concepts and/or concept patterns can be utilized in information retrieval searching.

Various embodiments leverage techniques for breaking down critical ideas from an inputted phrase into concepts in order to provide a response that is more relevant to the inputted phrase. In this regard, concepts and/or concept patterns are utilized with information retrieval searching to provide more relevant and concise documents in response to an inputted phrase. In addition, concepts and/or concept patterns are utilized with respect to assessing information (e.g., documents) available in a knowledge base and building appropriate pre-defined responses to an inputted phrase.

In one or more embodiments, an inputted phrase is received and concepts and/or concept patterns are attributed to the phrase such that a document set can be searched to find those documents associated with the attributed concepts and/or concept patterns. One or more of these identified documents can then be provided in a response. In at least some embodiments, individual concepts are composed of (1) Vocab terms that include a grouping of unambiguous synonyms and misspellings, (2) Helper Terms of words that have no unambiguous synonyms and/or (3) Building Blocks of lists of vocabulary terms, lists of helper terms and/or lists of concepts.

In one or more embodiments, concepts are attributed to the documents of a knowledge base. The documents are then indexed based on the concepts and the resulting index is used as a tool to assess the breadth and depth of information available in the knowledge base and to build and/or modify certain pre-defined responses to certain types of inputted phrases. For example, in at least some embodiments, one or more knowledge base units composed of one or more patterns are built and/or modified based at least in part by assessing/analyzing the index. When one or more of these knowledge base unit's patterns matches a pattern found in an inputted phrase, that knowledge base unit triggers a response that can include, among other things, one or more of the knowledge base documents.

Multiple and varied embodiments are described below. Generally, any of the functions described with reference to the figures can be implemented using software, firmware (e.g., fixed logic circuitry), manual processing or any combination thereof.

Documents

It is to be noted that the term "document" as used herein can refer to any suitable type of information in any suitable form. By way of example and not limitation, a document can be all or part of a web page, data file, computer code or other piece of information. In addition, providing one or more documents can include providing all or part of one or more documents themselves and/or providing data associated with the one or more documents such as, for instance, a description of or link to the one or more documents. For example, in the context of a document that is a web page, providing the web page can include, without limitation, displaying all or part of the web page's content via a web browser and/or providing a link/reference to all or part of the web page's content.

Concepts

Concepts and Information Retrieval

As noted above, traditional information retrieval techniques typically rely on vocabulary term matching when searching through documents to identify documents for a response. Specifically, these information retrieval techniques typically sort through large numbers of documents to identify those documents having vocabulary words and/or phrases found in a phrase(s) inputted by a user. As a result, documents that are potentially valuable to the user, and relevant to their input, but that do not happen to have matching vocabulary words and/or phrases are often not returned/retrieved in a response. Conversely, documents that are not of value to the user, but that happen to have matching vocabulary words and/or phrases, are often returned/retrieved.

As a simple example of this, consider a user who is interested in learning more about saving money in a bank and thus inputs the following phrase (expressed as a question) into a dialog/search field associated with an information retrieval engine:

Input: What is the current rate of interest offered at banks?

Using conventional vocabulary term matching techniques, a relevant document may not be identified and returned/retrieved in a response if it contains and/or is indexed with vocabulary terms that are different from those in the inputted phrase. For example, consider a web page for a fictional Acme Credit Union which explains the advantages of a money market account but contains and/or is indexed with vocabulary terms that are not found in the inputted phrase, such as "money market account," "deposit account" and "savings account" for instance. Using typical vocabulary term matching techniques, this relevant document will likely not be identified or returned/retrieved.

Similarly, using typical vocabulary term matching techniques, a data record that is not relevant (i.e., not be associated with the same or similar ideas) to the user's inputted phrase might nevertheless still be identified and returned/retrieved in a response. As an example, again, consider the following inputted phrase:

Input: What is the current rate of interest offered at banks?

A data record that is not relevant, such as a web page advertising legal services associated with filing for bankruptcy, but that contains and/or is indexed with vocabulary terms found in the inputted phrase (e.g., "interest offered", "rate" and "bank") will likely be returned/retrieved in a response.

To return/retrieve more relevant documents in a response, in at least some implementations an information retrieval engine can employ techniques associated with leveraging concepts. For purposes of this discussion, a concept can be thought of as a breakdown of critical ideas. With respect to an inputted phrase, an idea or ideas—and thus one or more concepts—can be attributed to the input when the input is received. With respect to documents available to the information retrieval engine for responding to an inputted phrase, a critical idea or ideas—and thus one or more concepts—can also be attributed to individual documents. The information retrieval engine can then index the documents (i.e., build an index or indexes) based on their respective concept(s) such that the information retrieval engine is able to respond relatively quickly to the inputted phrase by querying the index and returning/retrieving any documents with one or more concepts matching those attributed to the phrase.

As an example, consider once again the following user input:

Input: What is the current rate of interest offered at banks?

Here, certain critical ideas, such as those associated with types of deposit accounts for instance, can be broken down into the concept account types and attributed to this inputted phrase and to a document which does not have any vocabulary terms matching the phrase. As but one example of such a document, consider the fictional Acme Credit Union's web page described above which explains the advantages of a new money market account and is thus relevant to this input. Despite not containing and/or being indexed with any vocabulary terms matching those in the input, this web page might nevertheless have the concept account types attributed to it. As such, by virtue of being indexed by this attributed concept, this web page can be included by the information retrieval engine in a response.

Components of Concepts

As noted above, a concept can be thought of as a breakdown of critical ideas. In at least some implementations, a concept is manifest as being composed of patterns of one or more Vocabs, Helper Terms and/or Building Blocks which are described individually below. In addition, some concepts can also be composed of one or more Wild Cards. Wild Cards are also described below.

Vocabs

A Vocab is a grouping of unambiguous synonyms and misspellings. The name of a particular grouping of synonyms is known as a Vocab Term. Vocab Terms usually end with the suffix "vocab." Consider the following examples:

AccountVocab
  Account
  Accounts
  Accounts
  Account's
PriceVocab
  Price
  Prices
  Prise
  Prises
  Cost
  Costs
  Cost's BankVocab
    Bank
    Banks
    Bank's
    Lender
    Lenders
    Credit union
    Credit Unions In the example of PriceVocab, the word "cost" is included because for this example, a user defining these Vocab Terms wants the vocabulary terms/words "price" and "cost" to be synonymous. Similarly, the user wants the vocabulary terms/words "bank," "lender" and "credit union" to be synonymous.

Helper Terms

A Helper Term is a word that does not have unambiguous synonyms but nevertheless functions almost the same way as a Vocab. Helper Terms mostly consist of conjunctions. Consider the following examples:
    and
    is
    for
    the Building Blocks A Building Block is a list of either Vocab/Helper Terms or a list of concepts that may be useful when categorized together. As an example, consider the following:
    Anatomy (Vocab Building Block):
        armvocab
        legvocab
        headvocab
        shouldervocab
        feetvocab Now that these Vocab Terms are bundled together, they can be used in a Concept pattern. Here is an example use of a Vocab Building Block:
    surgeryvocab AND Anatomy (Building Block)
    brokenvocab AND myvocab AND Anatomy (Building Block)

In this example, because the Anatomy Building Block contained five Vocab Terms, it turned what would have been ten patterns into two. Also notice that Vocab Terms, which include all the synonyms and misspellings, are also included in this example. As another example, consider the following:
    Types of Accounts (concept Building Block)
        Savings Accounts
        Checking Accounts
        Money Market Accounts
        Investment Accounts
        Mortgage Accounts This Building Block would then be used to reduce the number of concept patterns necessary.

Wild Cards

Wild Cards function as placeholders within Concepts for any random word or words.

Creating Concepts

Concepts can be created or built through any suitable means and this can be performed manually, automatically or by any combination thereof. As noted above, a concept is usually made up of patterns of Vocabs, Helper Terms, and Building Blocks (and occasionally Wild Cards) listed within the concept. For example, the above concept Building Block types of accounts might be all or part of pattern making up the concept account types.

As another example, here are patterns that might make up a savings account concept:
    savingsvocab AND accountvocab
    accountvocab AND for AND savingsvocab
    interestvocab AND bearingvocab AND accountvocab Notice that the word "for" is a Helper Term and does not end with the suffix "vocab." In concepts, two things that are important are order and proximity, both of which are optional when creating any given pattern.

If an order is selected for a pattern of a concept, the pattern will specify a particular order (i.e., ordering) with respect to two or more of the pattern's Vocab, Helper Terms, and/or Building Blocks. For example, in such situations, a pattern of a concept specifying the order "savings account" would be different from the pattern of a concept "account savings." Similarly, if a proximity is selected for a pattern of a concept, the pattern will specify the proximity of two or more of the pattern's Vocab, Helper Terms, and/or Building Blocks. In such situations, a pattern of a concept specifying that the terms "savings" and "account" are to be positioned next to one another would be different from the pattern of a concept with the phrase "savings in my account."

Note that for most input patterns, it is advantageous to have both an order and a proximity selected. In the above example, "Savings Account" has a very different meaning than "Account Savings" and "Savings in my Account." Concepts also have their own associated test questions for the purposes of testing.

Examples of Savings Account test questions might include:
    Do you have savings accounts at your bank?
    What's a savings account?
    Do you have any interest bearing accounts Information Retrieval Search FIG. 1 illustrates one embodiment of an environment 100 in which concepts and/or concept patterns can be utilized with information retrieval searching to provide more relevant and concise documents in response to a user's input. It is to be appreciated that the environment 100 is but one example of a suitable environment. Therefore, the environment 100 is not intended to suggest any limitation in the scope of the described subject matter. Furthermore, the environment 100 should not be interpreted as having any dependency or requirement relating to any one or combination of components illustrated therein.

The computing environment 100 includes, in this example, a user 102 inputs information and/or receives response information via one or more applications 104. While the inputted information can be in any suitable form. Here, the information is in the form of one or more phrases consisting of any number of terms associated with one or more ideas, as discussed above. As such, and as described in more detail below, one or more concepts and/or concept patterns can be attributed to the inputted phrase(s). The received response information can also be in any suitable form such as, without limitation, one or more documents provided as a response to the inputted information. The user can input the phrase(s) by any suitable means such as, without limitation, electronically via a keyboard, microphone or other input apparatus such that it can be received by the one or more applications 104. For example, the user might input a phrase by typing on a keyboard communicatively linked with one or more computing devices which include one or more processors and one or more computer-readable media. The one or more computer-readable media might in turn include an operating system and one or more applications, including the one or more applications 104, which are both executable by the processor(s).

The one or more applications 104 can include any suitable type of application(s) capable of providing, as part of its functionality, a user interface for (1) receiving the inputted phrase(s) from the user and/or presenting the response information to the user and (2) receiving information from and/or sending information to an information retrieval component 106. The term "component" as used herein can refer to software, hardware, firmware or a combination thereof and can reflect an actual physical grouping and allocation and/or correspond to a conceptual allocation of different tasks. Furthermore, a component can be located at a single location (e.g., as implemented by multiple processing/computing devices) or multiple locations (e.g., as implemented by multiple processing/computing devices).

In this example, the one or more applications 104 and the information retrieval component 106 are communicatively linked such that each can send information to and/or receive information from one another. In at least some embodiments, the one or more applications 104 and the information retrieval component 106 are communicatively linked via one or more networks such as, without limitation: the Internet, one or more local area networks (LANs), one or more wide area networks (WANs) or any combination thereof.

In accordance with at least some embodiments, the information retrieval component 106 utilizes the services of an information retrieval engine 108 (IRE) to process documents in a document set 110 and perform searches on these documents in an efficient manner. In this regard, the IRE 108 is configured to perform a search based on the phrase(s) inputted by the user 102 and identify (i.e., find) and/or retrieve one or more documents which make up a response to the inputted phrase(s).

As will be appreciated and understood by those skilled in the art, to allow the IRE 108 to search in an efficient manner, the information retrieval component 106 can create and/or maintain a representation of the document set 110 that organizes (e.g., lists) the individual document's content according to certain types of content. Here, document set is organized according to at least two types of content: concepts and vocabulary terms. In at least some embodiments, such as the one described and illustrated here, the information retrieval component 106 accomplishes this by utilizing the IRE 108 to create, maintain and use a representation of the document set 110 in the form of one or more indexes, depicted here as index table(s) 112. Put another way, individual documents of the document set 110 are effectively indexed, based on their concepts and on their vocabulary terms, by the IRE 108 as the index table(s) 112. Individual records in the index table(s) 112 point to, and thus correspond with, the individual documents in document set 110. As such, the IRE 108 can then expeditiously query the index table(s) 112 rather than actually having to sort through the documents in the document set 110.

Note that here, the document set 110 and the index table(s) 112 are depicted as including both concepts and actual vocabulary terms. In fact, as noted above, the index table(s) 112 has organized the individual documents in the document set 110 based on concepts and vocabulary terms. In this regard, individual documents making up the document set 110 can have data or metadata that not only includes vocabulary terms, but also one or more concepts and/or concept patterns that have been attributed to them. These individual documents can thus be associated with a corresponding record in the index table(s) 112. As such, the IRE 108 can perform an information retrieval search of the document set 110 based on vocabulary terms and/or concepts (and/or concept patterns) by querying the index table(s) 112 to identify one or more appropriate documents with respect to the phrase inputted by the user 102. Specifically, the IRE 108 can query the index table(s) 112 (and thus effectively search the document set 110) to identify (1) one or more documents containing at least one vocabulary term found in the inputted phrase and/or (2) to identify one or more documents associated with at least one concept (and/or concept pattern) attributed to the inputted phrase.

Once the IRE 108 has queried the index table(s) 112 and identified the appropriate document(s), the information retrieval component 106 can provide the user 102 with a response that includes the appropriate document(s). In this regard, and as explained in detail above, the term "document" as used herein can refer to any suitable type of information in any suitable form. For example, here the appropriate document(s) might include a web page which displays information, links to another document and/or solicits the user 102 for additional information. Furthermore, providing can include providing all or part of one or more documents themselves and/or providing data associated with the one or more documents. For example, here providing might be accomplished at least in part by retrieving all or part of the web page, and/or data associated with the web page, and sending/presenting it to the user via the one or more applications 104.

Information Retrieval Search

Figure 2:
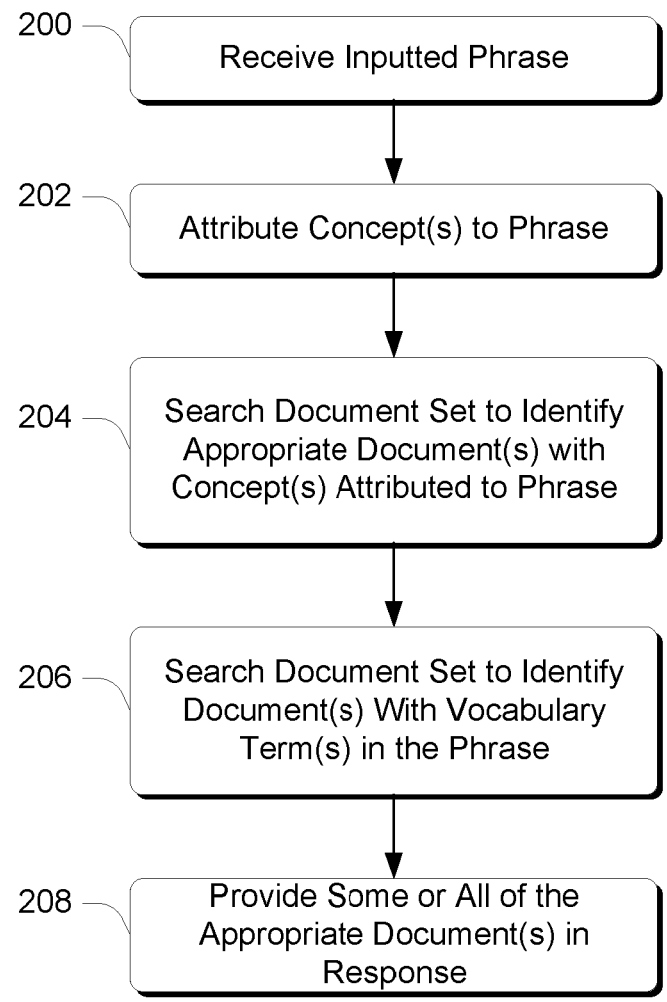
FIG. 2 illustrates one embodiment of a method associated with information retrieval searching.

FIG. 2 illustrates one embodiment of a method associated with information retrieval searching. The order in which the method is described is not intended to be construed as a limitation, and any number of the described method blocks can be combined in any order to implement the method, or an alternate method. In addition, the method can be implemented in connection with any suitable hardware, software, firmware or combination thereof. In at least some embodiments, the method can be implemented in connection with a suitable environment such as the environment 100 (FIG. 1) above. It is to be appreciated and understood, however, that aspects of the described method can be implemented in an environment other than the environment 100 without deviating from the course and scope of the claimed subject matter.

In one embodiment, the environment receives 200 an inputted phrase. As noted above, this inputted phrase can be input by a user such as the user 102 above. Furthermore, as also noted above, this inputted phrase can consist of one or more terms that are associated with one or more ideas. As such, the environment attributes 202 one or more concepts and/or concept patterns to the phrases. This can be accomplished in any suitable fashion.

The environment searches 204 a document set, such as the document set 110 in the environment 100 (FIG. 1) for instance, to identify one or more appropriate documents having at least one concept attributed to the phrase. Searching can be accomplished in any suitable way. For example, as described above, an information retrieval component can utilize an information retrieval engine (e.g., the IRE 108) to query an index to identify the appropriate document(s).

With respect to attributing concepts, an individual document can have one or more concepts and/or concept patterns attributed to it any suitable way. For example, one or more intelligent software applications called "agents" or "spiders" might be configured and employed to automatically scour/search through the content of the document to recognize and attribute one or more concepts to the document. Alternatively or additionally, one or more users might manually perform this task.

Recall that by virtue of the fact that a concept consists of one or more patterns of Vocabs, Helper Terms and/or Building Blocks, concepts (and/or concept patterns) attributed to the inputted phrase may specify an order and/or proximity of two or more of the Vocabs, Helper Terms and/or Building Blocks. As such, documents associated with these concepts and/or concept patterns specifying an order and/or proximity can be identified as appropriate documents and returned during this search.

The environment searches 206 the document set to identify one or more documents with vocabulary terms found in the phrase. This can be accomplished in any suitable way. For example, the information retrieval component 106 can utilize the IRE 108 (FIG. 1) to query an index table. Identifying documents with vocabulary terms matching those in the inputted phrase can be useful with respect to organizing and/or narrowing the number of documents ultimately provided in a response. For example, the relevance of the identified appropriate documents can be ranked with respect to each other based at least in part on the number of matching vocabulary terms, if any, each has. This ranking can then be used to organize how the appropriate documents are provided in the response (e.g., ordered from most to least relevant) and/or to determine which appropriate documents should be removed from the response (e.g., remove any documents with less than a defined number of vocabulary term matches).

Continuing, the environment provides 208 some or all of the appropriate documents in response. This can be accomplished in any suitable way such as, for example, by the information retrieval component providing information to the user via a user interface of an application.

Knowledge Base Principles and Knowledge Base Units

Knowledge bases provide a way in which a suite of intelligent applications, referred herein as ActiveAgent, can provide users with specific pre-defined responses. ActiveAgent can take the form of a virtual expert or agent that understands phrases inputted by a user and provides a respond to the user. Knowledge bases can cover the entire scope of information that ActiveAgent uses, along with all of its capabilities. In at least some embodiments, knowledge base files themselves are written in a programming language known as FPML (Functional Presence Markup Language), a language similar to XML. This includes master FPML files, optional FPML files, and lex files. For additional information on FPML, the reader is referred to U.S. Pat. Nos. 7,565,368 and 7,603,705, the disclosures of which are incorporated herein by reference.

KB Units

To provide the user with specific pre-defined responses, in at least some embodiments knowledge base units are utilized. Knowledge base units are composed of concepts and Helper Terms arranged into input patterns. In other words, knowledge base units are composed of one or more patterns, each pattern consisting of one or more concepts and Helper Terms. When a pattern of a knowledge base unit matches an input pattern found in a phrase(s) inputted by a user, the knowledge base unit is triggered to activate a response which can include, among other things, one or more documents. As such, knowledge base units are an effective way in which responses can be customized for one or more types of phrase(s) inputted by a user.

Concepts and/or concept patterns can be utilized with respect to assessing the knowledge base and building knowledge base units. For example, in at least some embodiments, concepts and/or concept patterns are attributed the documents in the knowledge base. An index of these documents based on these concepts is then created, maintained and used as a tool to assess the breadth and depth of information available in the knowledge base and to determine whether knowledge base units need to be created, modified or even removed.

Knowledge Base Assessment/Response Building

Figure 3:
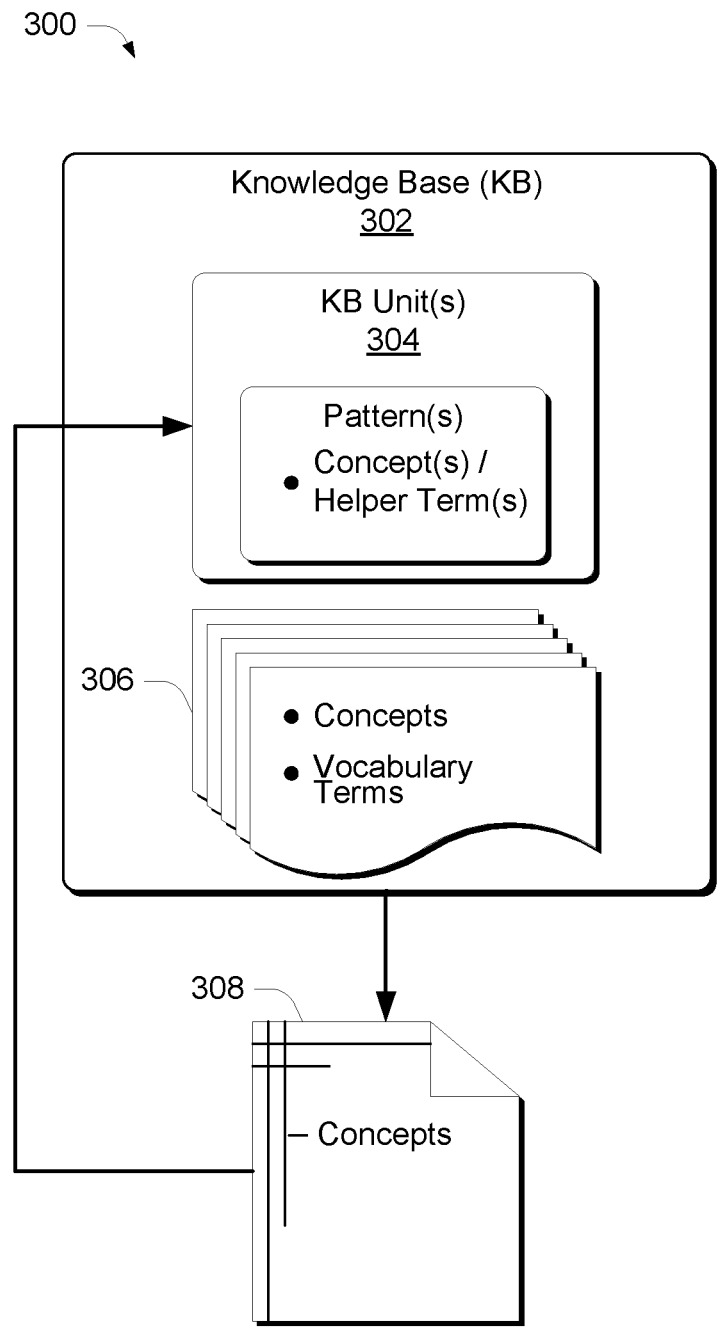
FIG. 3 illustrates one embodiment of an environment in which an index of knowledge base documents based on concepts can be used.

FIG. 3 illustrates one embodiment of an environment 300 in which an index of knowledge base documents based on concepts can be used as a tool to assess the breadth and depth of information available in a knowledge base and to build and/or modify knowledge base units, and thus responses. It is to be appreciated that the environment 300 is but one example of a suitable environment. Therefore, the environment 300 is not intended to suggest any limitation in the scope of the described subject matter. Furthermore, the environment 300 should not be interpreted as having any dependency or requirement relating to any one or combination of components illustrated therein.

In one embodiment, the computing environment 300 comprises, in this example, a knowledge base 302 (KB). As noted above, in at least some embodiments, the files of the KB 302 are written in a FPML. The KB 302 is composed of, among other things, one or more KB units 304 and a KB document set 306. For the purposes of this discussion, the KB document set 306 can be thought of as a set of data. For instance, the KB document set 306 can be a collection of web pages, data records and/or other information associated with a particular enterprise.

As described above, individual elements of the KB units 304 are composed of one or more patterns. Each pattern in turn consists of one or more concepts and Helper Terms such that when the pattern matches an input pattern in an inputted phrase, the pattern associated with the KB unit 304 is triggered to activate a response. In this regard, note here that individual documents in the KB document set 306 are associated with both vocabulary terms and concepts. While all of the documents in the document set 306 are illustrated here as being associated with both vocabulary terms and concepts, it is to be appreciated and understood that the KB 302 also may comprise one or more other documents which may or may not be associated with vocabulary terms and concepts.

Continuing, with respect to vocabulary terms, typically when a document is created it includes or is otherwise associated with one or more vocabulary terms. However, vocabulary terms can also be attributed to, or disassociated from, a document at any time. With respect to concepts, these can be associated to, or disassociated from, a document at any time as well. Furthermore, this can be accomplished in any suitable way, as will be described in more detail below.

By virtue of individual documents in the document set 306 being associated with concepts, a representation of the document set 306 can be created that organizes the document's content according to the content type of concept. This can be accomplished in any suitable way. For example, in at least some embodiments an information retrieval engine, such as the IRE 108 (FIG. 1) above for instance, can be utilized to create and maintain a representation in the form of one or more index tables, here depicted as one or more index tables 308. In this regard, the one or more index tables 308 provides an index by which the documents of the document set 306 are organized. Put another way, individual documents of the document set 306 are effectively indexed, based on their concepts, as the one or more index tables 308. As such, individual records in the one or more index tables

308 point to, and thus correspond with, individual documents in the document set 306.

As will be appreciated and understood by those skilled in the art, the one or more index tables 308 can be used as a tool to assess the breadth and depth of information available in the document set 306, and thus available in the KB 302. For instance, based on which documents are or are not associated with a particular concept and/or concept pattern, the breadth or amount of information available with respect to a particular concept becomes more apparent and observable. In addition, the depth or level of detail of this information also becomes more apparent and observable.

Additionally or alternatively, the one or more index tables 308 can be used as a tool to build and/or modify the individual KB units 304, and thus certain pre-defined responses. Further discussion of this is provided below.

Building and/or Modifying KB Units

Figure 4:
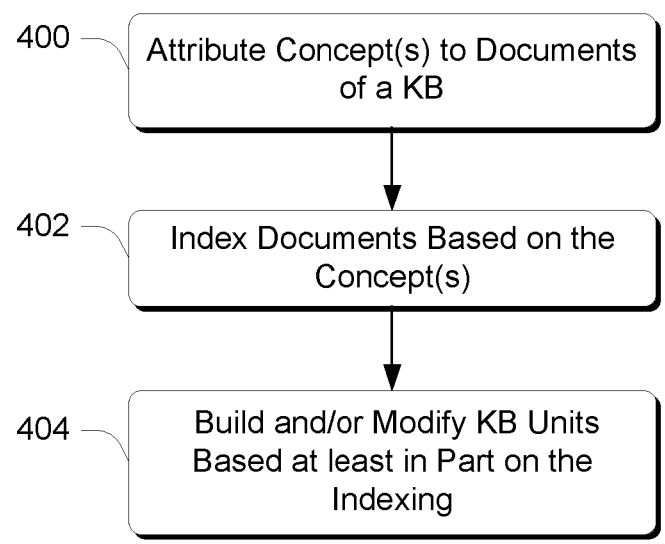
FIG. 4 illustrates one embodiment of a method associated with building and/or modifying knowledge base units.

FIG. 4 illustrates one embodiment of a method associated with building knowledge base units. The order in which the method is described is not intended to be construed as a limitation, and any number of the described method blocks can be combined in any order to implement the method, or an alternate method. In addition, the method can be implemented in connection with any suitable hardware, software, firmware or combination thereof. In at least some embodiments, the method can be implemented in connection with a suitable environment such as the environment 300 (FIG. 3) above. It is to be appreciated and understood, however, that aspects of the described method can be implemented in an environment other than the environment 300 without deviating from the course and scope of the claimed subject matter.

In one embodiment, an environment, such as the environment 300, attributes 400 one or more concepts to documents of a knowledge base. As noted above, this can be accomplished in any suitable way. For example, one or more intelligent software applications called "agents" or "spiders" might be configured and employed to automatically scour/search through the contents of the documents to recognize and attribute one or more concepts to one or more of the documents. Alternatively or additionally, one or more users might manually perform this task.

The environment indexes 402 the documents based on the concept(s). This can be accomplished in any suitable way. For instance, as described above, in at least some embodiments, an information retrieval engine can be utilized to build and maintain a representation in the form of one or more indexes (e.g., the index tables 308 described with reference to FIG. 3).

The environment builds and/or modifies 404 one or more knowledge base units based at least in part on the indexing. In at least some embodiments, this can be accomplished by utilizing the indexed information to determine which knowledge base units exist, or should exist, for each concept that is indexed. Specifically, an indexed concept can be examined and assessed with respect to which document(s) it is associated with. This allows for documents which should be, but are not, associated with the concept to easily be identified. For example, web page related to mortgage interest rates (e.g., comparing and discussing 10-year, 15-year and 30-year mortgage interest rates) might not be associated with a concept (such as the concept account types discussed above) that will result in it being included in a response to a certain type of question, such as the example inputted phrase:

Input: What is the current rate of interest offered at banks?

As such, if it is determined that the web page should be included in a response to this type of question, appropriate action can be taken. For example, a knowledge base unit can be created or modified such that it will be triggered by the above response (or another response having an input pattern matching the knowledge base unit's pattern). In addition, this document might be associated with the concept and/or other additional concepts.

Furthermore, examining and assessing an indexed concept allows for documents which are, but should not be, associated with the concept to be easily identified. To use the example above, if it is determined that the web page above related to mortgage interest rates should not be included in a response to the type of question above (e.g., the web page's information is too detailed (deep) or is otherwise not desirable), appropriate action can also be taken. For example, the appropriate knowledge base unit can be modified or removed such that it will not be triggered by the above response (or another response having an input pattern matching the knowledge base unit's pattern).

Figure 5:
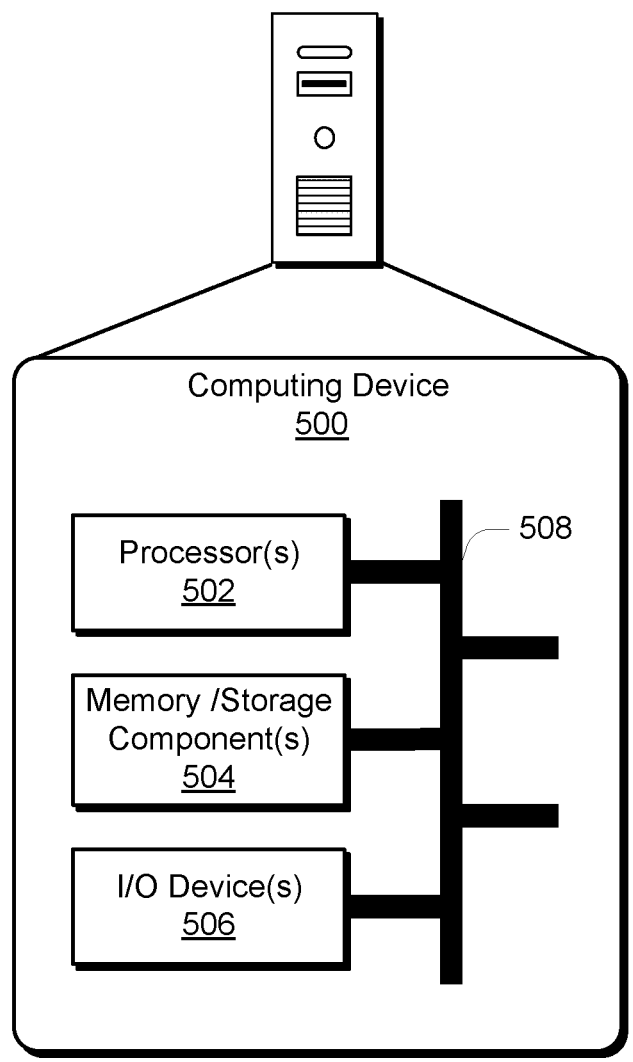
FIG. 5 illustrates one embodiment of a computing device which can be used in one embodiment of a system.

FIG. 5 illustrates one embodiment of a computing device 500 which can be used in one embodiment of a system to implement the various described embodiments. The computing device 500 can be, for example, one or more of the computing devices described above regarding FIG. 1 or any other suitably configured computing device. For the sake of clarity, the computing device 500 is illustrated and described here in the context of a single computing device. However, it is to be appreciated and understood that any number of suitably configured computing devices can be used to implement a described embodiment. For example, in at least some implementations, multiple communicatively linked computing devices are used. One or more of these devices can be communicatively linked in any suitable way such as via one or more networks. One or more networks can include, without limitation: the Internet, one or more local area networks (LANs), one or more wide area networks (WANs) or any combination thereof.

In this example, the computing device 500 comprises one or more processors or processing units 502, one or more memory and/or storage component(s) 504 and one or more input/output (I/O) devices 506. Additionally, the computing device 500 comprises a bus 508 that allows the various components and devices to communicate with one another. The bus 508 represents one or more of any of several types of bus structures, including a memory bus or memory controller, a peripheral bus, an accelerated graphics port, and a processor or local bus using any of a variety of bus architectures. The bus 508 may comprise wired and/or wireless buses.

The memory and/or storage component(s) 504 represent one or more computer-readable media. The component(s) 504 may comprise volatile media (e.g., random access memory (RAM)) and/or nonvolatile media (e.g., read only memory (ROM), Flash memory, optical disks, magnetic disks and the like). The component(s) 504 may comprise fixed media (e.g., RAM, ROM, a fixed hard drive, etc.) as well as removable media (e.g., a Flash memory drive, a removable hard drive, an optical disk and the like).

The one or more I/O devices 506 allow a user to enter commands and information to the computing device 500, and also allow information to be presented to the user and/or other components or devices. Examples of input devices include a keyboard, a cursor control device (e.g., a mouse), a microphone, a scanner and the like. Examples of output devices include a display device (e.g., a monitor or projector, speakers, a printer, a network card, and the like).

Techniques may be described herein in the general context of software or program modules or components. Software can include routines, programs, objects, components, data structures and the like that perform particular tasks or implement particular abstract data types. An implementation of these modules or components and techniques may be stored on and/or transmitted across some form of computer-readable media. In this regard, computer-readable media can be any available medium or media useable to store information and accessible by a computing device.

Various embodiments are described which leverage techniques for breaking down critical ideas from an inputted phrase into concepts in order to provide a response that is more relevant to the inputted phrase. In this regard, concepts and/or concept patterns are utilized with information retrieval searching to provide more relevant and concise documents in response to an inputted phrase. In addition, concepts and/or concept patterns are utilized with respect to assessing information (e.g., documents) available in a knowledge base and building appropriate pre-defined responses to an inputted phrase.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, via a virtual agent, an inputted phrase, wherein the virtual agent is an intelligent software application that understands phrases received from a user and provides a response to the user;
   identifying multiple words contained in the inputted phrase;
   determining a first vocab term that corresponds to a first word of the multiple words in the inputted phrase, the first vocab term including at least one synonym of the first word and at least one spelling variation of the first word;
   determining a second vocab term that corresponds to a second word of the multiple words in the inputted phrase, the second vocab term including at least one synonym of the second word and at least one spelling variation of the second word;
   representing the inputted phrase with the first vocab term and the second vocab term in an order that is the same as an order of the first word and the second word in the inputted phrase;
   determining a concept that is associated with the represented inputted phrase;
   searching websites to identify a website that is associated with the concept;
   storing the concept and information identifying the website in a knowledge base and making the knowledge base available for a query comprising the inputted phrase or the represented inputted phrase, wherein the knowledge base comprises documents that cover the scope of information that the virtual agent uses, along with the capabilities of the virtual agent, and is comprised of files written in a markup language; and
   causing the virtual agent to provide a response to the inputted phrase that includes a link to the website.

2. The method of claim 1, wherein one or more of the determining the first vocab term or the determining the second vocab term is performed at least in part by an information retrieval engine (IRE).

3. The method of claim 1, wherein the website does not contain any of the multiple words that are in the inputted phrase.

4. The method of claim 1, wherein the searching comprises searching the websites to identify a website that is associated with the concept and that contains at least one of the multiple words in the inputted phrase.

5. The method of claim 4, wherein the searching further comprises ranking websites based at least in part on the number of terms in each of the websites that match a term in the inputted phrase.

6. The method of claim 1, wherein the websites are indexed according to one or both of vocabulary terms or concepts.

7. A method comprising:
   maintaining a representation that organizes a plurality of documents based at least in part on concepts that are attributed to the plurality of documents, wherein the representation comprises an index into a knowledge base for response to a user input;
   receiving, via a virtual agent, the user input, wherein the virtual agent is an intelligent software application that understands phrases received from a user and provides a response to the user;
   identifying multiple terms contained in the user input;
   determining a first vocab term that corresponds to a first term of the multiple terms in the user input, the first vocab term including at least one synonym of the first term and at least one spelling variation of the first term;
   determining a second vocab term that corresponds to a second term of the multiple terms in the user input, the second vocab term including at least one synonym of the second term and at least one spelling variation of the second term;
   representing the user input with the first vocab term and the second vocab term in an order that is the same as an order of the first term and the second term in the user input;
   determining a concept that is associated with the represented user input;
   attributing the concept to the user input;
   in response to attributing the concept and at least partly by the virtual agent, searching the representation to find a document of the plurality of documents associated with the concept that is attributed to the user input; and
   causing the virtual agent to provide data associated with the document.

8. The method of claim 7, wherein at least one of the maintaining, the determining the first vocab term, or the determining the second vocab term is performed at least in part by an information retrieval engine (IRE).

9. The method of claim 7, wherein the found document does not contain any of the multiple terms that are in the user input.

10. The method of claim 7, wherein the found document comprises a web page.

11. A method comprising:
    attributing one or more concept patterns to a plurality of documents of a knowledge base, wherein the knowledge base comprises concept information and document information;
    indexing the plurality of documents based on the one or more concept patterns;

building the knowledge base based at least in part on the indexing, wherein the knowledge base is configured to trigger a response to a user input;

receiving, via a virtual agent, the user input, wherein the virtual agent is an intelligent software application that understands phrases received from a user and provides a response to the user;

identifying multiple terms contained in the user input;

determining a first vocab term that corresponds to a first term of the multiple terms in the user input, the first vocab term including at least one synonym of the first term and at least one spelling variation of the first term;

determining a second vocab term that corresponds to a second term of the multiple terms in the user input, the second vocab term including at least one synonym of the second term and at least one spelling variation of the second term;

representing the user input with the first vocab term and the second vocab term in an order that is the same as an order of the first term and the second term in the user input;

determining a concept that is associated with the represented user input; and causing the virtual agent to provide a response that is associated with the concept.

12. The method of claim 11, wherein the knowledge base is associated with a pattern of words and is configured to trigger a response when one or more of the patterns matches a pattern found in the user input.

13. The method of claim 11, wherein the knowledge base is composed of a pattern specifying two or more terms in the pattern.

14. The method of claim 11, wherein the knowledge base comprises files written in Functional Presence Markup Language (FPML).

15. The method of claim 11, wherein individual concept patterns comprise building blocks comprising one or more of a list of vocab terms, a list of helper terms, or a list of concepts.

16. The method of claim 11, wherein indexing is performed at least in part by an information retrieval engine (IRE).

17. The method of claim 11, wherein the response comprises data associated with one or more of the plurality of documents.

18. The method of claim 17, wherein the data comprises a document configured to solicit information from a user.

19. The method of claim 17, wherein the data comprises a web page.

* * * * *